March 8, 1966 C. E. MORSE ETAL 3,239,610

LINE CIRCUIT FOR KEY TELEPHONE SYSTEM

Filed Dec. 26, 1962

2 Sheets-Sheet 1

INVENTORS C. E. MORSE
J. P. SMITH
BY E. J. Olinder
ATTORNEY

March 8, 1966 C. E. MORSE ETAL 3,239,610

LINE CIRCUIT FOR KEY TELEPHONE SYSTEM

Filed Dec. 26, 1962 2 Sheets-Sheet 2

United States Patent Office 3,239,610

Patented Mar. 8, 1966

3,239,610

LINE CIRCUIT FOR KEY TELEPHONE SYSTEM

Charles E. Morse and John P. Smith, Holmdel, N.J., assignors to Bell Telephone Laboratories, Incorporated, New York, N.Y., a corporation of New York Filed Dec. 26, 1962, Ser. No. 246,905
10 Claims. (Cl. 179—42)

Figures 1, 3:
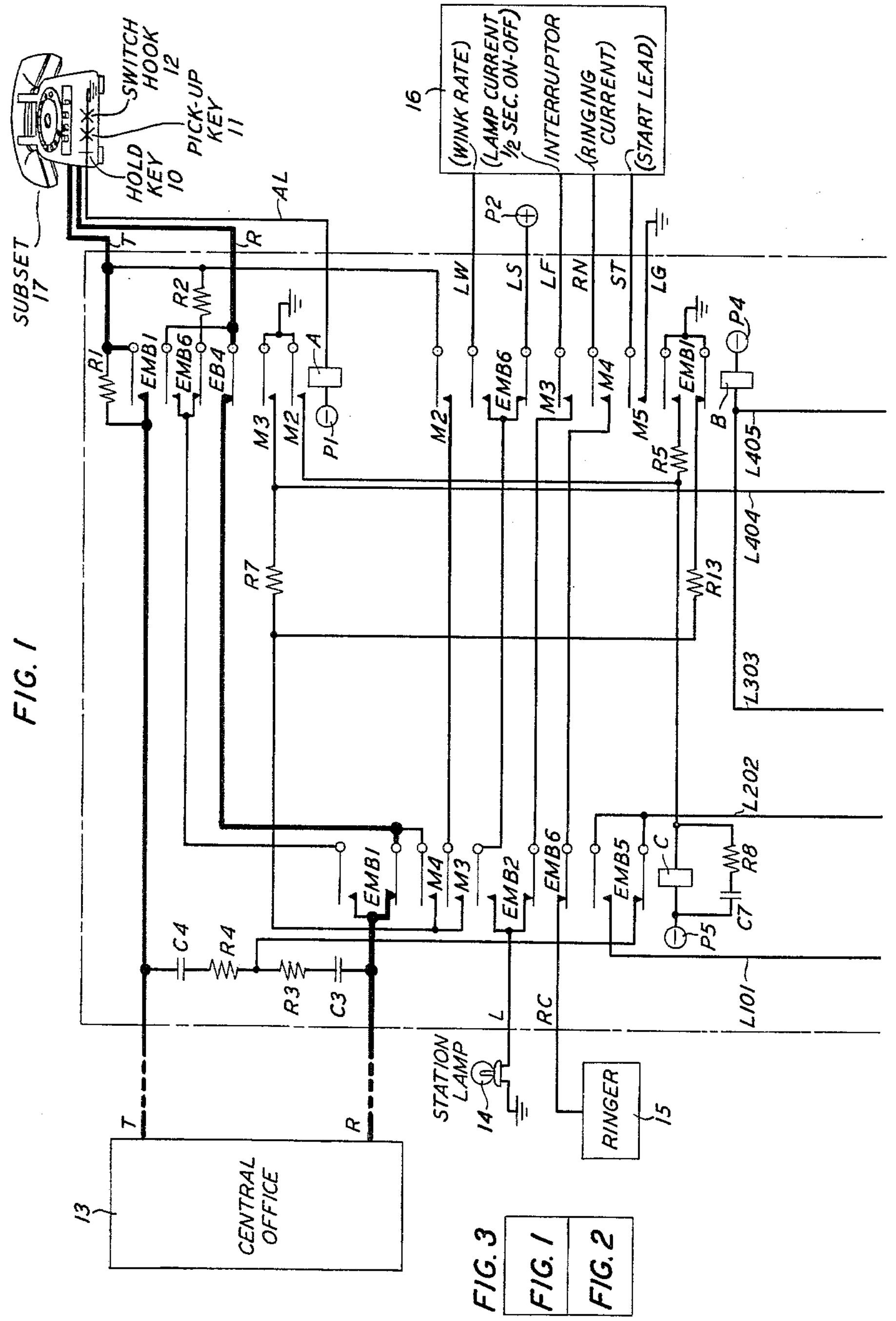

This invention relates to telephone systems and more particularly to the type of control facilities known generally as telephone line circuits. The general object of the invention is to simplify telephone line circuits.

Telephone line circuits are employed to perform various control and supervisory functions incident to the establishment of a connection between a common switching point such as a central office or PBX and one or more telephone sets at a subscriber's premises. In the case of a line circuit serving a plurality of telephone sets in a key telephone system, the functions typically performed by the line circuit include signaling a particular subscriber station in response to a central office or PBX ringing signal, holding that line in response to manual key operation by the subscriber, indicating by means of visual or audible signals whenever a line is being called, held or busy, timing out visual and audible signals when an incoming call is not answered and originating and holding outgoing calls.

Line circuits find such extensive use in the telephone plant that cost is necessarily a prime consideration and any reduction in the complexity of such circuits, as by a reduction in the number of circuit devices or components, for example, may be reflected in a substantial over-all reduction in cost. Known attempts in the prior art to effect such savings have been successful only at the expense of a reduction in circuit versatility or at the expense of circuit reliability, or both.

Accordingly, a specific object of the invention is to reduce the number of components required in telephone line circuits without sacrificing reliability or flexibility of performance, thereby to minimize line circuit installation and maintenance costs.

Another object of the invention is to reduce the power requirements of telephone line circuits thereby to permit the utilization of relatively low impedance circuit devices and longer loop lengths.

These and other objects are achieved in accordance with the principles of the invention by a telephone line circuit employing multifunction transistors for the control of relays in the performance of supervisory functions. In accordance with the invention, in one illustrative line circuit for a key telephone system the initiation of local ringing is made directly responsive to the inception of central office ringing by employing rectified ringing current to control the state of conduction of a transistor which in turn controls a relay that performs a dual function as a line holding device and a visual and audible signaling control device. Whether visual or audible signaling is employed is made to depend on the condition of operation of a second relay. Connection between a particular telephone set of the system and the telephone line is controlled by the combined operation of a third relay and the second relay. Line holding is made responsive, conventionally, to the manual operation of a telephone set key button. In accordance with the invention, operation of the telephone set line holding key operates the second and third relays mentioned above which in turn connect a holding bridge across the line in lieu of the telephone set. Additionally, the control transistor is connected in circuit with the holding bridge in a fashion which establishes a preselected conducting state for the control transistor which in turn governs the operation of the signal control relay.

In accordance with another aspect of the invention time-out of local ringing signals is effected after some preselected period by means of a passive timing circuit acting in combination with a second control transistor which in turn controls the operation of the first control transistor and hence the signaling control relay.

In accordance with the principles of the invention the circuit devices indicated are uniquely interconnected to enable each to perform a plurality of functions in connection with the various steps of line circuit supervisory control. As a result, the need for a so-called "start" relay conventionally employed in line circuits for key telephone systems has been eliminated.

Accordingly one feature of the invention is a telephone line circuit in a key telephone system employing a transistor controlled relay to effect visual or audible signaling indicative of the supervisory state of the circuit and also to effect time-out of local ringing.

Another feature of the invention is a line circuit employing a number of circuit devices each performing a plurality of functions related to circuit supervisory control thereby eliminating the need for a conventional start relay.

A further feature of the invention is the employment of transistor controlled relays whereby relay operating current requirements are reduced to enable the employment of miniaturized relays, thereby facilitating the use of increased loop lengths.

Figure 2:
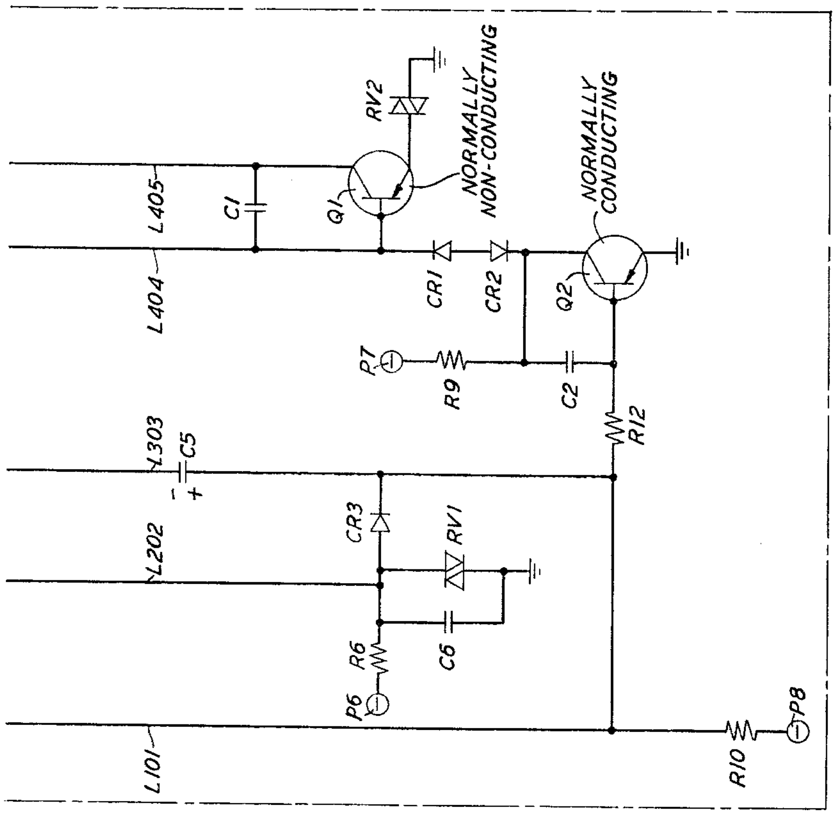

The principles of the invention together with additional objects and features thereof may be fully apprehended from the following detailed description of an illustrative embodiment and from the accompanying drawing in which:

FIGS. 1 and 2 together show a schematic circuit diagram of a telephone line circuit in accordance with the invention; and FIG. 3 is a block diagram of the relation between FIGS. 1 and 2.

In FIGS. 1 and 2 a subscriber's telephone set 17, illustrative of one of the sets of a key telephone system, is shown connected through to a central office 13, which may be a PBX, over conventional T and R leads. Connection to the line is controlled by relays A and C. A third relay B in combination with relay C controls the conducting paths between interruptor 16, local ringer 15 and station lamp 14. The operation of relay B is in turn controlled by transistors Q1 and Q2 and their associated circuit components. The precise interrelation among the key circuit devices indicated may be readily ascertained from the following description of the major circuit functions and operations of the line circuit shown in FIGS. 1 and 2.

*Incoming call*

When an idle circuit condition exists, relays A, B, and C are in the unoperated condition, transistor Q1 is in a nonconducting state and transistor Q2 is in a conducting state. Direct current is supplied from power supply P8 to the base of transistor Q2 through resistors R10 and R12. This current acts to maintain transistor Q2 in the conducting state.

When ringing current is applied to the connecting line from central office 13, or from a PBX, the A.-C. component on the T and R leads flows through either capacitor C3 and resistor R3 or capacitor C4 and resistor R4 over break contacts EMB5 of relay C to varistor RV1 by way of lead L202. The particular current path taken of the two alternate paths described depends on the nature of the connections to the T and R leads at central office 13. The voltage limiting action of varistor RV1 limits the peak signal voltage to some preselected magnitude such as 10 volts for example. Diode CR3 rectifies the A.-C. signal voltage and the positive cycles are passed to the positive side of capacitor C5. The base current of transistor Q3 normally maintains this point at a slight negative voltage such as −4 volts for example. The positive pulses cause capacitor C5 to increase in charge to a point at which it becomes sufficiently positive to shunt the base current of transistor Q2. Capacitor C2 increases the switching time of transistor Q2, however, so that it does not stop conducting immediately. This delay, added to the time required to charge capacitor C5, as indicated above, provides protection against false operation of the ring-up circuit as the result of transients which may occur upon disconnect or upon other circuit operations.

The collector of transistor Q2 becomes negative when conduction ceases. This negative potential is applied to the base of transistor Q1 through diodes CR2 and CR1. Diode CR1 is a Zener or breakdown type of diode that breaks down upon the application of a preselected voltage, 6.2 volts being an illustrative magnitude. At this point transistor Q1 conducts, completing an operating path for relay B from ground through varistor RV2, the emitter-collector circuit of transistor Q1, the windings of relay B, and thence to power supply P4. Relay B operated applies ground to start lead ST over lead LG by way of make contact M5. The application of ground to interruptor 16 by way of start lead ST is employed to start the motor (not shown) of the interruptor which controls the various interruptor cycles. Interruptor 16 is shown in block form inasmuch as such equipment is wholly conventional, generally consisting of motor driven cams which operate contacts to provide the desired interruption rates for both visual and audible signaling. Interrupted lamp current for station signaling lamp 14 is supplied from the interruptor by way of lead LF, contact M3 of relay B, break contact EMB2 of relay C and lead L. A typical interruption rate provides for one-half second ON-OFF flashing.

Ringing current is supplied from interruptor 16 by way of lead RN, contact M4 of relay B, break contact EMB6 of relay C, lead RC and thence to local ringer 15. The provision of steady or interrupted ringing current is optional.

Ground is extended over make contact EMB1 of relay B and resistor R5 to the winding of relay C. However, the resulting current flow is insufficient to cause relay C to operate. Transistor Q2 remains nonconducting and transistor Q1 conducting until the call is answered or timed out.

Capacitor C6 bypasses any high frequency voltage induced in the line or resulting from A.-C. ground potential. Accordingly, it offers protection against false operation of the ring-up circuit. Resistor R6 forms a voltage divider with varistor RV1 which maintains diode CR3 back-biased. This arrangement isolates the base circuit bias of transistor Q2 from ground through varistor RV1.

*Time-out of ring-up circuit*

The potential across capacitor C5 just before transistor Q1 conducts, is at a fixed level which may be on the order of 24 volts for example. The potential on the collector of transistor Q1 changes from −24 volts to approximately ground when conduction begins. The negative lead of capacitor C5 is also grounded inasmuch as it is connected to the same point. With the illustrative voltage magnitudes given, the potential across capacitor C5 remains at 24 volts at this time, the positive side of capacitor C5 reaching a positive 24 volts when the negative side is grounded. Capacitor C5 discharges through resistor R10.

Transistor Q2 remains in the non-conducting state, as described hereinabove, until capacitor C5 discharges to a level that permits sufficient current to flow in the base circuit to cause the transistor to conduct. Where an incoming call is signaled with a single ring, the time constant of the combination of capacitor C5 and resistor R10 fixes the time required to discharge to the level indicated. Discharge time may be on the order of 26 seconds for example. Any additional ring received before the preselected level of discharge is reached acts to reset this time to a shorter duration such as 16 seconds. When capacitor C5 has sufficiently discharged, transistor Q2 conducts, the collector changes from the −24 volts indicated above to approximately ground. This voltage change removes the negative bias from the base circuit of transistor Q1 causing it to turn off. The turn-off of transistor Q1 opens the operating path of relay B, relay B releases and the circuit is returned to the idle circuit condition.

*Answering an incoming call*

An incoming call is answered by operating pick-up key 11 which is associated with the line being rung and removing the handset of subset 17 from its mounting. Operation of make switchhook contact 12 extends ground over pick-up key 11, hold key 10 and lead AL to the winding of relay A. Relay A operated prepares the talking path to central office 13 (or to a PBX). Ground is extended to the base circuit of transistor Q1 over a path which includes contact M3 of relay A with the result that transistor Q1 is turned off and relay B is released. Ground is extended to relay C over contact M2 of relay A. Relay C operated completes the talking path over make contact EMB1 of relay C and make contact EMB6 of relay A. Relay C operated also completes a path over make contact EMB2 for the steady operation of station lamp 14. Lead RC of ringer R15 is open at break contact EMB6 of relay C which discontinues local audible signaling and provides a discharge circuit for capacitor C5 by connecting its positive lead to the negative voltage of power source P6 by way of make contact EMB5 and resistor R6.

*Outgoing calls*

The procedure for making an outgoing call is the same as that for answering an incoming call except that transistor Q1 is in the nonconducting state and accordingly relay B is in the unoperated condition.

*Holding*

An incoming or outgoing call can be held by operating hold key 10 in a telephone set such as subset 17 that is associated with the line to be held. The operated hold key 10, break contact, opens ground extended over lead AL causing relay A to release. Relay A released connects the holding bridge comprising resistors R1 and R2 across the T and R leads by way of break contact EMB6 of relay A and make contact EMB1 of relay C. The station R lead is connected to the base of transistor Q1 by way of resistor R7 and contact M4 of relay C. Ground is removed from the base lead of transistor Q1 by the opening of contact M3 of relay A and ground is similarly removed from relay C by the opening of contact M2 of relay A.

Relay C is slow to release as a result of the RC circuit comprising resistor R8 and capacitor C7 shunting its winding. A negative voltage existing between resistors R1 and R2 supplies base current to transistor Q1 through the station shunt. At this point, transistor Q1 conducts, completing the operating path for relay B as previously described. Relay B operated provides a holding path for relay C by way of resistor R5 and make contact EMB1 of relay B. Ground is supplied to interruptor 16 by way of lead LG, contact M5 of relay B and lead ST which starts or continues the signal interruptor operation. A path for the operation of station lamp 14 is completed over contact M3 of relay B. The base circuit of transistor Q1 is connected to the center of the holding bridge (resistors R1 and R2) by way of a path which includes resistor R7, contact M4 of relay C and contact EB4 of relay A. The circuit will remain in the condition described until a station connects to the line or until the line is opened.

*Release of the holding bridge by station*

Any station of the key telephone system that seizes the line by operating the associated pick-up key with its handset off hook causes relay A to operate over the grounded AL lead. Relay A operated removes the holding bridge from the line by the operation of make contact EMB1 of relay A and break contact EMB6 of relay A. The station's T and R leads are connected to the line by way of make contact EMB1 of relay A and make contact EMB6 of relay A. Ground is extended to relay C by way of make contact M2 of relay A and to the base of transistor Q1 by way of contact M3 of relay A. The circuit is then restored to a busy condition.

It is to be understood that the circuit described is merely illustrative of the principles of the invention. A wide variety of modifications thereto may be effected by persons skilled in the telephone art without departing from the spirit and scope of the invention.

What is claimed is:

1. In a line circuit for a key telephone system including a subscriber's telephone line, local ringing means, means responsive to ringing current from a remote location for initiating the operation of said local ringing means, means responsive to the termination of said ringing current for disabling said local ringing means, and means for holding said subscriber's line, said initiating means and said holding means each including a common multifunction relay and a common multifunction transistor.

2. In a line circuit for a key telephone system local ringing means, means responsive to an alternating ringing current from a remote location for initiating the operation of said local ringing means, said initiating means including means for rectifying said ringing current, means including a capacitor for building up an electrical charge of a preselected level in response to the flow of current from said rectifying means, circuit interruptor means including a source of local ringing current, and means responsive to the build-up of an electrical charge to said preselected level by said capacitor for initiating the establishment of a first current path between said interruptor and said local ringing means thereby to operate said local ringing means.

3. Apparatus in accordance with claim 2 wherein said initiating means includes a first transistor including a base circuit, a collector circuit and an emitter circuit, said first transistor being switched from a nonconducting to a conducting state by the application of a voltage of said preselected level to said base circuit thereof whereupon current is caused to flow in said emitter and collector circuits thereof, a relay circuit including a normally uncompleted operating path, means responsive to the flow of current in said collector circuit for completing said operating path whereupon said relay operates to complete said first current path.

4. Apparatus in accordance with claim 3 wherein said operating path completing means includes a second transistor responsively operative to the operation of said first transistor.

5. In a line circuit for a key telephone system, local ringing means, a telephone line circuit interruptor means including a source of local ringing current, means including a first relay for completing a current path between said interruptor means and said ringing means, means including first and second transistors operatively responsive to the application of ringing current to said line circuit from a remote location, said first relay being operatively responsive to the operation of said transistors, a subscriber's telephone set including line holding means, a holding bridge, means including a second relay responsive to the operation of said line holding means for disconnecting said set from said telephone line and for connecting said bridge across said telephone line in lieu thereof, and means including said second transistor responsive either to the manually initiated release of said line holding means or to the opening of said telephone line for disconnecting said holding bridge from across said line and reconnecting said set to said line.

6. In a line circuit for a key telephone system, in combination, a relatively distant centralized control point, a telephone set, a telephone line connectable between said control point and said telephone set, means including a first relay and a second relay for completing a conducting path including said telephone line between said control point and said telephone set, local ringing means, means responsive to ringing current applied to said telephone line from said control point for operating said local ringing means, said operating means including a conducting path over contacts of said second relay, means for rectifying said ringing current, a first normally nonconducting transistor, a second normally conducting transistor, a third relay and interrupter means including a source of current for said local ringing means, said second transistor being switched from a conducting to a nonconducting state in response to the application of current from said rectifying means and said first transistor being switched from a nonconducting to a conducting state in response to the switching of said second transistor to a nonconducting state, means including said first transistor for completing an operating path for said third relay, whereby upon the switching of said first transistor to a conducting state a conducting path is completed by said third relay between said last named source of current and said local ringing means, the operating path of said first relay including pick-up key contacts and switchhook contacts, the operating path of said second relay including operated contacts of said first relay, whereby upon the operation of said pick-up key and switchhook contacts said first and second relays operate, the operation of said second relay opening contacts in a conducting path between said telephone line and said rectifying means, thereby terminating the operation of said local ringing means.

7. Apparatus in accordance with claim 6 wherein said telephone set includes hold-key contacts in the operating path of said first relay, a holding bridge, means responsive to the release of said first relay occurring upon the opening of said hold-key contacts for connecting said holding bridge across said line in lieu of said telephone set, means including contacts on said first and second relays for completing a conducting path from said telephone line to said first transistor thereby to apply an operating bias current to said first transistor, thereby switching said first transisitor to a conducting state, whereupon said third relay operates, visual signaling means, said interruptor including a source of operating current for said visual signaling means, said third relay including a set of unoperated contacts for completing a conducting path between said last named source of current and said visual signaling means, said last named conducting path including a set of operated contacts of said third relay.

8. Apparatus in accordance with claim 7 wherein said third relay includes a set of operated contacts completing a holding path for said second relay.

9. A line circuit for a key telephone system comprising, in combination, a telephone set, a telephone line, a transistor, first, second and third relays, local ringing means, a holding bridge, a current supply for said local ringing means, means including said second and third relays for completing a conducting path between said current supply and said local ringing means, means responsive to ringing current applied to said line for switching said transistor from a nonconducting to a conducting state, said third relay being responsively operative to said transistor being switched from said nonconducting to said conducting state, means including said first and second relays for connecting said telephone set to said line, means including a hold key for releasing said first relay whereupon said holding bridge is connected across said line in lieu of said telephone set, means responsive to the connection of said holding bridge across said line for applying an operating bias to said transistor thereby switching said transistor to a conducting state, visual signaling means and means including said second and third relays for applying an operating current to said visual signaling means thereby to give visual indication of a hold condition.

10. Apparatus in accordance with claim 9 wherein said switching means includes rectifying means and a second transistor.

No references cited.

ROBERT H. ROSE, *Primary Examiner.*